UNITED STATES PATENT OFFICE.

EDWARD MARK SLOCUM, OF MEDAN, SUMATRA, DUTCH EAST INDIES, ASSIGNOR TO GENERAL RUBBER COMPANY, A CORPORATION OF NEW JERSEY.

RUBBER COMPOSITION AND PROCESS FOR THE PRODUCTION THEREOF.

1,332,926.  Specification of Letters Patent.  Patented Mar. 9, 1920.

No Drawing. Application filed February 23, 1917. Serial No. 150,353.

*To all whom it may concern:*

Be it known that I, EDWARD MARK SLOCUM, a citizen of the United States, residing at Medan, Province of Deli, Sumatra, Dutch East Indies, have invented certain new and useful Improvements in Rubber Compositions and Processes for the Production Thereof, of which the following is a full, clear, and exact description.

This invention relates to rubber or similar vulcanizable plastic compositions and to processes for producing the same. It is more particularly directed to a softened rubber composition and the process employed in its production.

Softened rubbers heretofore known have consisted of natural rubbers of high resin content or material produced by the admixture of castor or other oils or resins with rubber. Natural rubbers of high resin content have little ability to withstand wear and oil- or resin-treated rubbers are comparatively expensive.

One object of the present invention accordingly is to produce an inexpensive rubber composition having ability to withstand wear, good adhesive properties, and other desirable characteristics. Another object is to improve the curing properties of the rubber. Another object is to provide a simple process for the production of such material.

The preferred material is made according to the following process:—Hevea or other rubber-producing latex is treated with 0.2% of sodium fluorid based on the weight of the latex. After five to eight hours the latex thickens or becomes coalesced, whereby its viscosity is increased and a medium produced in which various materials such as oils, fibers, etc., may be uniformly suspended. The term "coalesced" as here employed is intended to designate a thick molasses-like state assumed by the latex as distinguished from the stiff form which the latter assumes upon coagulation. To the coalesced latex are added pulped hevea seeds which have previously been hulled and ground to an emulsion. The quantity of pulped seed employed will vary in accordance with the desired characteristics of the resultant product. For a somewhat soft rubber suitable for tube stock and the like a small proportion of the seed based on the coalesced latex will be used. For a sticky rubber suitable for rubber tape and the like, a relatively larger percentage will be employed. The pulped seed emulsion is disseminated throughout the mass and is retained in substantially uniformly suspended condition until coagulation occurs. Sulfur or another vulcanizing agent may be added, along with the pulp, or the addition may be made prior to that of the pulp, or at any time before vulcanization. The rubber may then be vulcanized.

An analysis of hevea seeds with hulls removed shows that they contain the following ingredients in approximately the proportions stated:

| | |
|---|---|
| Oil | 31.1% |
| Proteins | 18.2% |
| Starch and woody fiber | 35.4% |
| Ash and mineral matter | 2.2% |
| Moisture | 13.1% |

Of these substances as introduced by the seeds the oil serves to soften the rubber, and the proteins aid in the subsequent curing of the rubber, acting in the capacity of catalysts during the vulcanizing process. If desired any portion of the protein may be removed before addition of the pulp, or, any or all of the starch and woody fiber.

The material obtained as a result of the process outlined possesses the characteristics set forth as the objects of the invention, namely, low cost, adhesiveness and good wearing qualities, and upon vulcanization shows improved curing properties.

It is pointed out that the matter of the introduction of proteins into latex becomes particularly important when the normal content of such protein is below the average. For example, the protein content of coagulum from "cup- and can-washings" (wash-water accumulating from the rinsing of latex-cups and cans) is low due to their dilution, and it will be readily seen that the seed-pulp may serve an important function here in restoring the normal content. It will be noted also that although rubber seed pulp is the preferred compounding ingredient, under some circumstances this pulp may be replaced by various other naturally oleaginous vegetable tissues such as cocoanut meat, camphor wood, castor beans, etc. It will also be understood that although the composition as herein set forth is prepared from latex it may also be prepared from coagulum or from rubber ready for compounding. Further, although the composition set forth is made up of rubber from hevea latex and admixed hevea seed pulp, such pulp or similar substance may be added to various other kinds of natural rubbers and the like, as well as to artificial or synthetic rubbers. It will be understood that the pulp may be made up of hulled or unhulled hevea or other seeds.

As many apparently widely different embodiments of this invention may be made without departing from the spirit thereof, I do not intend to limit myself to the specific disclosure as herein set forth, except as indicated in the appended claims.

Having thus described my invention what I claim and desire to protect by Letters Patent is:

1. A composition of matter comprising an admixture of a vulcanizable plastic and rubber seed pulp.

2. A composition of matter comprising an admixture of rubber and hevea seed pulp.

3. A process of the kind described which comprises, incorporating a naturally oleaginous vegetable tissue substantially undeprived of its original oil content with rubber-producing latex, coagulating the latex, and vulcanizing the rubber produced.

4. A process of the kind described which comprises incorporating seeds of a rubber-producing plant with a vulcanizable plastic and vulcanizing the resultant mass.

5. A process of the kind described which comprises, incorporating oily seed pulp with rubber-producing latex, coagulating the latex, and vulcanizing the rubber produced.

6. A process of the kind described which comprises, causing coalescence in rubber-producing latex, adding an oleaginous vegetable tissue thereto, coagulating the latex, and vulcanizing the rubber produced.

7. A process of the kind described which comprises, causing coalescence in rubber-producing latex, adding oily seed pulp thereto, coagulating the latex, and vulcanizing the rubber produced.

8. A process of the kind described which comprises causing coalescence in rubber-producing latex, adding pulped hevea seeds thereto, coagulating the latex, and vulcanizing the rubber produced.

9. A composition of matter comprising rubber derived from latex coagulated in the presence of rubber seed pulp.

10. A composition of matter comprising rubber derived from latex coagulated in the presence of hevea seed pulp.

11. A composition of matter comprising rubber derived from latex coagulated in the presence of rubber seed pulp substantially undeprived of its original oil content.

Signed at New York, county and State of New York, this 31st day of January, 1917.

EDWARD MARK SLOCUM.